2,782,164
CORROSION PREVENTION

Paul W. Fischer, Whittier, and John W. Scheffel, Fullerton, Calif., assignors to Union Oil Company of California, Los Angeles, Calif., a corporation of California No Drawing. Application September 8, 1953,
Serial No. 379,090

22 Claims. (Cl. 252—8.55)

This invention relates to corrosion prevention, and in particular concerns compositions and methods for preventing corrosion in oil wells.

In many of the oil-producing areas of the United States the production of crude oil from the well is accompanied by the production of aqueous brines containing dissolved carbon dioxide and/or hydrogen sulfide. Such brines are highly corrosive with respect to ferrous metals, and are responsible for frequent failures of metallic equipment associated with the well, e. g., the well tubing, sucker rods and sucker rod boxes, pump parts, gathering lines, tanks, etc. In numerous instances the corrosion damage is so severe as to require replacement of sucker rods and pump parts as often as once a month and replacement of at least part of the tubing string as often as once a year. The cost of such replacement, together with the cost of constant inspection and the loss in oil production during the frequent periods when the well is shut down for inspection and replacements, is a major factor in the cost of the oil produced. Among those who have been most closely associated with the problem of preventing corrosion in oil and gas wells it is generally conceded that the most satisfactory solution lies in the use of chemical corrosion inhibitors which can be introduced directly into the well and admixed with the well fluids before the latter come into substantial contact with the metallic well equipment.

Among the wide variety of materials which have been suggested for use as corrosion inhibitors in this manner are the reaction products of fatty acids or fatty oils with certain alkanolamines. These products are shown in U. S. Patent No. 2,614,980 to be 85–99% effective in preventing corrosion of hydrogen sulfide brines at ordinary temperatures and pressures. However, it has been found that such products are not nearly so effective in the frequent instance where the brine contains dissolved carbon dioxide and where conditions of moderately elevated temperature and pressure prevail, as in relatively deep wells. For example, the product obtained by reacting 70 parts by weight of oleic acid with 37 parts by weight of triethanolamine at 400°–422° F. for 1 hour is taught in the aforementioned patent to be 95% effective with respect to a hydrogen sulfide brine at ordinary temperatures and pressures, but has been found to be only about 1–3% effective with respect to a carbon dioxide brine at 110° C. and 70 lbs./sq. in. pressure.

We have now found that the effectiveness of the aforementioned class of products as corrosion inhibitors, particularly with respect to carbon dioxide-containing oil well brines at moderately elevated temperatures and pressures, can be greatly increased by employing such products in conjunction with certain metal soaps. More particularly, we have found that a combination of certain metal soaps of carboxylic or sulfonic acids and the products of reaction between fatty acids or oils and certain alkanolamines is highly effective in preventing the corrosion of ferrous metals by oil well brines containing dissolved carbon dioxide and/or hydrogen sulfide. The soap and reaction product may be introduced into the well fluid within the well bore as separate entities or they may be combined with the aid of a suitable solvent to form a corrosion inhibiting composition which can be stored and shipped as such and introduced into the well bore as a single entity. As is hereinafter more fully explained, various other agents may be included in such compositions to supplement the combined corrosion inhibiting power of the soap and the reaction product.

The metal soaps which are employed in conjunction with the aforementioned reaction product are the alkaline-earth and heavy metal soaps of carboxylic acids containing at least about 8 carbon atoms or of oil-soluble petroleum sulfonic acids. As is well known, the latter are generally referred to as "mahogany acids," and are obtained by the treatment of various petroleum fractions with strong sulfuric acid. The carboxylic acids may be resin acids, such as abietic acids, rosen, tall oil, etc., naphthenic acids, such as are isolated from certain types of petroleum, or fatty acids such as lauric, oleic, palmitic, ricinoleic and stearic acids. The metals which are combined with said acids to form the soaps of the present class are those of groups I–B and II–VIII, inclusive, of the periodic table, e .g., copper, calcium, magnesium, zinc, barium, mercury, cadmium, aluminum, titanium, tin, lead, vanadium, chromium, iron, nickel, cobalt, manganese, etc. As specific examples of the soaps of the present class there may be mentioned copper naphthenate, zinc stearate, calcium petroleum sulfonate, magnesium resinate, barium palmitate, aluminum mono-stearate, chromium naphthenate, manganese resinate, iron petroleum sulfonate, nickel laurate, lead ricinoleate, cadmium oleate, titanium phenylstearate, tin naphthenate, copper octoate, etc. Mixtures of such soaps may also be employed. Lead soaps are preferred, and lead naphthenate in particular has proved outstanding.

The reaction products which are employed in conjunction with the soaps of the present class in accordance with the invention are obtained by reacting a fatty acid containing at least about 12 carbon atoms or a fatty oil which contains fatty acid radicals containing at least about 12 carbon atoms with an alkylolamine containing between 2 and about 20 carbon atoms. As examples of the fatty acids which may be employed in preparing such reaction products there may be mentioned oleic, palmitic, stearic, linoleic, linolenic, lauric, myristic, cerotic and eleostearic acids. Suitable fatty oils include castor oil, menhaden oil, linseed oil, tung oil, cottonseed oil, coconut oil etc. Castor oil acids and castor oil are preferred. Suitable alkanolamines include mono-, di- and tri-ethanolamine, di-n-propanolamine, di-iso-butanolamine, diethyl-ethanolamine, tri-tert. butanolamine, monododecanolamine, ethyl di-iso-propanoamine, di-n-octanoamines, tri-isopentanolamine, hydroxy - ethoxy - ethylamine, dihydroxy - propylamine, etc. The ethanolamines, particularly diethanolamine, are preferred.

The reaction products of the aforesaid fatty acids with the aforesaid alkanolamines are obtained simply by heating the two reactants at a temperature between about 100° C. and about 320° C., preferably between about 150° C. and about 280° C. The time required for completion of the reaction is usually between about ½ and about 10 hours, depending to a large extent upon the identity of the fatty material. If desired, the reaction may be carried out in the presence of a catalytic amount, e. g. 0.05–1.0 percent based on the weight of the reactants, of an alkali such as sodium hydroxide or sodium carbonate. Between about 0.5 and about 5 moles of the fatty acid or fatty oil are employed per mole of the alkanolamine. Upon completion of the reaction the product is allowed to cool, whereupon it takes the form of a yellow to brown highly viscous liquid or semi-solid which may be employed directly and without further treatment in accordance with the invention.

In treating a well to inhibit corrosion therein in accordance with the invention, the metal soap and the above-described reaction product may be introduced into the well fluids via the well tubing or casing as separate entities, i. e., the required amount of the metal soap may be passed down the well tubing to be followed by the reaction product, or vice versa. Usually, however, it is more convenient to admix the two at the surface, and introduce them into the well as a single corrosion inhibiting composition. The ratio in which the metal soap and reaction product are employed may be varied over relatively wide limits, e. g., the combination may contain from about 15 to about 85 percent by weight of the soap and from about 85 to about 15 percent by weight of the reaction product. The amount in which the combination is employed should of course be sufficient to effect a substantial degree of corrosion inhibition, which amount will depend primarily upon the nature of the well fluid and the temperature and pressure conditions encountered. Ordinarily, highly satisfactory results are obtained when the combined volume of the soap and reaction product represents between about 0.001 and about 0.1 percent of the volume of the well fluid being treated.

According to another embodiment of the invention, the metal soap and reaction product are combined to form a corrosion inhibiting composition which can be stored and shipped as such and introduced into the well bore as a single entity. Such compositions are prepared with the aid of a solvent to promote compatibility of the soap and the reaction product, and will ordinarily comprise between about 20 and about 80 percent by weight of the soap and the reaction product and between about 80 and about 20 percent by weight of the solvent. If desired, a portion of the solvent may be replaced by certain optional components, as described hereinafter. In the interests of economy, a liquid petroleum hydrocarbon is usually employed as the solvent, although any organic solvent capable of dissolving or dispersing the soap and the reaction product is suitable. A light extract oil, such as is obtained by extracting a lubricating oil fraction with phenol has been found particularly suitable for this purpose, and a very simple but highly effective composition of the present type may be prepared simply by stirring between about 20 to about 80 parts each of the soap and the reaction product into about 200 parts of lubricating oil extract.

As optional components, the corrosion inhibiting compositions of the invention may also contain a long-chain aliphatic amine containing at least about 10 carbon atoms, e. g., laurylamine, oleylamine, hexadecylamine, and/or a drying oil such as linseed oil, tung oil, hemp oil, etc., and/or a fatty material such as degras, lard oil, etc. The exact manner in which these optional components function to contribute to the corrosion inhibiting properties of the composition is not entirely understood, but it may be noted that the drying oils are capable of forming a corrosion resistant varnish-like coating on metal surfaces with which they come in contact. The long-chain amines are known to have some corrosion inhibiting properties and their inclusion in the composition of the invention permits a reduction in the amount of reaction product employed. These optional components may each be provided in amounts ranging from about 3 to about 10 percent by weight of the entire composition.

In order to test and demonstrate the corrosion inhibiting properties of the compositions provided by the invention the following procedure has been followed: Two 6-inch lengths of steel sucker rod are polished with emery, washed, and accurately weighed. These test specimens are then mounted side-by-side on the head of a 4-liter rocking autoclave. Two hundred ml. of kerosene containing 3 drops of the corrosion inhibitor to be tested are then introduced into the autoclave, and the head is bolted on. The autoclave is then purged with carbon dioxide to remove free air. Three and one-half liters of 3% aqueous sodium chloride from which dissolved air has been removed by purging with carbon dioxide are then introduced into the autoclave, and the latter is pressured up to about 20 p. s. i. g. with carbon dioxide. The simulated well fluid in the autoclave thus contains about 40 p. p. m. of the corrosion inhibitor being tested. Kerosene is employed as the hydrocarbon phase of the simulated well fluid since it is not known to contain any of the naturally-occurring corrosion inhibitors which are present in some crudes. The autoclave and the contents are heated at 100–110° C. under an autogenous pressure of about 70 p. s. i. g. for 24 hours. Upon completion of the heating period the autoclave is cooled to atmospheric temperature and opened, and the test specimens are removed, washed, and weighed. The efficiency of the inhibitor is calculated as follows:

$$\text{Efficiency} = \frac{W_1 - W_2}{W_1} \times 100$$

where $W_1$ is the loss in specimen weight (total of both specimens) with an uninhibited fluid and $W_2$ is the loss in specimen weight (total of both specimens) with the inhibited fluid.

The following examples will illustrate various ways in which the principle of the invention has been applied, but are not to be construed as limiting the same. All proportions are given in parts by weight.

Example I

Approximately 140 parts of oleic acid and 74 parts of triethanolamine were heated at 210° C. for 1 hour under reflux. The resulting reaction product was employed to prepare the following compositions:

No. 1: Parts
    Reaction product _____ 50
    Extract oil _____ 50
No. 2:
    Reaction product _____ 25
    Extract oil _____ 75
No. 3:
    Lead naphthenate _____ 25
    Extract oil _____ 75
No. 4:
    Reaction product _____ 25
    Lead naphthenate _____ 25
    Extract oil _____ 50

The extract oil was a phenol extract of a lubricating fraction. Upon testing each of these compositions by the procedure hereinbefore described, the following results were obtained:

| | Change in Weight, Mg. | Efficiency, Percent |
|---|---|---|
| Blank | −108.4 | 0.00 |
| Composition No. 1 | −98.6 | 9.0 |
| Composition No. 2 | −77.1 | 28.9 |
| Composition No. 3 | −85.6 | 21.0 |
| Composition No. 4 | +2.1 | 101.9 |

Example II

Approximately 2800 parts of castor oil and 750 parts of diethanolamine were heated at about 160° C. for about 16 hours while passing a stream of natural gas through the mixture to exclude air and assist in the removal of volatile substances. The resulting reaction product was a viscous greenish-brown liquid having a saponification number of 40 and an acid number of about 4. The following compositions were prepared:

No. 1:
    Reaction product _____ 25
    Extract oil _____ 75

No. 2:
    Lead naphthenate _____ 25
    Extract oil _____ 75

No. 3:
    Reaction product _____ 12
    Lead naphthenate _____ 25
    Extract oil _____ 63

These compositions were tested as hereinbefore described, and the following results obtained:

|  | Change in Weight, Mgs. | Efficiency, Percent |
|---|---|---|
| Blank | −108.4 | 0.00 |
| Composition No. 1 | −46.7 | 56.9 |
| Composition No. 2 | −85.6 | 21.0 |
| Composition No. 3 | +12.4 | 111.4 |

*Example III*

| Composition No. | 1 | 2 | 3 | 4 | 5 | 6 | 7 |
|---|---|---|---|---|---|---|---|
| Reaction Product,[1] Percent | 12 | 12 | 12 | 12 | 12 | 12 | 0 |
| Armeen 16 D,[2] Percent | 12 | 12 | 12 | 12 | 12 | 12 | 0 |
| Lubricating Oil, Percent | 76 | 51 | 51 | 51 | 51 | 51 | 0 |
| Lead Naphthenate, Percent |  | 25 | 1 |  |  |  | 0 |
| Copper Naphthenate, Percent |  |  | 25 |  |  |  | 0 |
| Zinc Naphthenate, Percent |  |  |  | 25 |  |  | 0 |
| Calcium Naphthenate, Percent |  |  |  |  | 25 |  | 0 |
| Lead Sulfonate, Percent |  |  |  |  |  | 25 | 0 |
| Change in Wt., mgs. | −117.1 | −2.8 | −19.7 | −18.4 | −39.8 | −22.8 | −108.4 |
| Efficiency, Percent | −8.0 | 97.3 | 81.8 | 83.0 | 63.2 | 78.9 | 0.0 |

[1] Prepared as in Example II.
[2] A mixture of $C_{16}$ alkylamines.

*Example IV*

|  | Composition No. 1 | Composition No. 2 |
|---|---|---|
|  | *Percent* | *Percent* |
| Ninol 400 | 20 | 20 |
| Reaction Product | 5 | 5 |
| Extract Oil | 57 | 57 |
| Degras | 10 | 10 |
| Linseed Oil | 3 | 3 |
| Lead Sulfonate | 5 | 0 |
| Lead Resinate | 0 | 5 |
|  | 100 | 100 |

The reaction product was that prepared in Example II. Ninol 400 is the trade name of a reaction product of mixed higher fatty acids and an alkanolamine. The test results were as follows:

|  | Change in Wt., mgs. | Efficiency, percent |
|---|---|---|
| Composition No. 1 | +9.4 | 108.6 |
| Composition No. 2 | −13.6 | 87.4 |

*Example V*

| | Parts |
|---|---|
| Ninol 400 | 20.0 |
| Reaction product | 5.0 |
| Cadmium naphthenate | 0.5 |
| Degras | 3.0 |
| Linseed oil | 10.0 |
| Extract oil | 61.5 |
|  | 100.0 |

Two quarts of the above composition were introduced into a well in the Montebello, California, field each day over a period of 3 months. During the 3-month test period, only one failure due to corrosion occurred. During the previous 1-year period, during which time the well was operated without anticorrosion treatment, a failure occurred every 4.3 weeks.

Other modes of applying the principle of our invention may be employed instead of those explained, change being made as regards the materials or steps herein disclosed provided the compositions or steps stated by any of the following claims, or the equivalent of such stated compositions or steps, be obtained or employed.

We, therefore, particularly point out and distinctly claim as our invention:

1. The method for reducing the corrosiveness of oil and gas well fluids comprising moisture and at least one acidic material selected from the class consisting of carbon dioxide and hydrogen sulfide towards ferrous metals under conditions of elevated temperature and pressure which comprises introducing into said well fluid a corrosion inhibiting amount of a mixture comprising between about 15 and about 85 percent by weight of a metal soap selected from the class consisting of the alkaline-earth and heavy metal soaps of oil-soluble petroleum sulfonic acids and carboxylic acids containing at least about 8 carbon atoms, and between about 85 and about 15 percent by weight of the product obtained by heating a mixture essentially comprising an alkylolamine monomer containing between 2 and about 20 carbon atoms and a fatty material selected from the class consisting of fatty acids containing at least about 12 carbon atoms and fatty oils which contain fatty acid radicals containing at least about 12 carbon atoms at a temperature between about 100° C. and about 320° C. for between about ½ and about 10 hours.

2. A method according to claim 1 wherein the said mixture is introduced into the well fluid in an amount corresponding to between about 0.001 and about 0.1 percent by volume of the fluid.

3. A method according to claim 1 wherein the said mixture is employed in the form of a solution comprising between about 20 and about 80 percent by weight of the mixture and between about 80 and about 20 percent by weight of a liquid petroleum hydrocarbon.

4. A method according to claim 1 wherein the said mixture comprises between about 15 and about 85 percent by weight of a heavy metal soap of an oil-soluble petroleum sulfonic acid and between about 85 and about 15 percent by weight of the product obtained by reacting an alkylolamine monomer containing between 2 and about 20 carbon atoms and a fatty acid containing at least about 12 carbon atoms at a temperature between about 100° C. and about 320° C. for between about ½ and about 10 hours.

5. A method according to claim 1 wherein the said mixture comprises between about 15 and about 85 percent by weight of a heavy metal soap of an oil-soluble petroleum sulfonic acid and between about 85 and about 15 percent by weight of the product obtained by reacting an alkylolamine monomer containing between 2 and about 20 carbon atoms and a fatty oil containing fatty acid radicals containing at least about 12 carbon atoms at a temperature betwen about 100° C. and about 320° C. for between about ½ and about 10 hours.

6. A method according to claim 1 wherein the said mixture comprises between about 15 and about 85 percent by weight of a heavy metal soap of a carboxylic acid containing at least about 8 carbon atoms and between about 85 and about 15 percent by weight of the product obtained by reacting an alkylolamine monomer containing between 2 and about 20 carbon atoms and a fatty acid containing at least about 12 carbon atoms at a temperature between about 100° C. and about 320° C. for between about ½ and about 10 hours.

7. A method according to claim 1 wherein the said mixture comprises between about 15 and about 85 percent by weight of a heavy metal soap of a carboxylic acid containing at least about 8 carbon atoms and between about 85 and about 15 percent by weight of the product obtained by reacting an alkylolamine monomer containing between 2 and about 20 carbon atoms and a fatty oil containing fatty acid radicals containing at least about 12 carbon atoms at a temperature between about 100° C. and about 320° C. for between about ½ and about 10 hours.

8. A method according to claim 6 wherein the said soap is lead naphthenate and the reaction product is obtained from an ethanolamine and a fatty acid containing at least about 12 carbon atoms.

9. A process according to claim 7 wherein the said soap is lead naphthenate and the reaction product is obtained from an ethanolamine and a fatty oil containing fatty acid radicals containing at least about 12 carbon atoms.

10. A process according to claim 7 wherein the said soap is lead naphthenate and the reaction product is obtained from diethanolamine and castor oil.

11. A corrosion inhibiting composition comprising between about 20 and about 80 percent by weight of a liquid petroleum hydrocarbon and between about 80 and about 20 percent by weight of a mixture comprising between about 15 and about 85 percent by weight of a metal soap selected from the class consisting of the alkaline-earth and heavy metal soaps of oil-soluble petroleum sulfonic acids and carboxylic acids containing at least about 8 carbon atoms, and between about 85 and about 15 percent by weight of the product obtained by heating a mixture essentially comprising an alkylolamine monomer containing between 2 and about 20 carbon atoms and a fatty material selected from the class consisting of fatty acids containing at least about 12 carbon atoms and fatty oils which contain fatty acid radicals containing at least about 12 carbon atoms at a temperature between about 100° C. and about 320° C. for between about ½ and about 10 hours.

12. A composition according to claim 11 wherein the said mixture comprises between about 15 and about 85 percent by weight of a heavy metal soap of an oil-soluble petroleum sulfonic acid, and between about 85 and about 15 percent by weight of the product obtained by reacting an alkylolamine monomer containing between 2 and about 20 carbon atoms with a fatty acid containing at least about 12 carbon atoms at a temperature between about 100° C. and about 320° C. for between about ½ and about 10 hours.

13. A composition according to claim 11 wherein the said mixture comprises between about 15 and about 85 percent by weight of a heavy metal soap of an oil-soluble petroleum sulfonic acid, and between about 85 and about 15 percent by weight of the product obtained by reacting an alkylolamine monomer containing between 2 and about 20 carbon atoms with a fatty oil containing fatty acid radicals containing at least about 12 carbon atoms at a temperature between about 100° C. and about 320° C. for between about ½ and about 10 hours.

14. A composition according to claim 11 wherein the said mixture comprises between about 15 and about 85 percent by weight of a heavy metal soap of a carboxylic acid containing at least about 8 carbon atoms, and between about 85 and about 15 percent by weight of the product obtained by reacting an alkylolamine monomer containing between 2 and about 20 carbon atoms and a fatty acid containing at least about 12 carbon atoms at a temperature between about 100° C. and about 320° C. for between about ½ and about 10 hours.

15. A composition according to claim 11 wherein the said mixture comprises between about 15 and about 85 percent by weight of a heavy metal soap of an oil-soluble petroleum sulfonic acid, and between about 85 and about 15 percent by weight of the product obtained by reacting an alkylolamine monomer containing between 2 and about 20 carbon atoms and a fatty acid containing at least about 12 carbon atoms at a temperature between about 100° C. and about 320° C. for between about ½ and about 10 hours.

16. A composition according to claim 14 wherein the soap is lead naphthenate and the reaction product is obtained from an ethanolamine and a fatty acid containing at least about 12 carbon atoms.

17. A composition according to claim 15 wherein the soap is lead naphthenate and the reaction product is obtained from an ethanolamine and a fatty oil containing fatty acid radicals containing at least about 12 carbon atoms.

18. A composition according to claim 15 wherein the soap is lead naphthenate and the reaction product is obtained from diethanolamine and castor oil.

19. A corrosion inhibiting composition comprising (1) between about 20 and about 80 percent by weight of a liquid petroleum hydrocarbon; (2) between about 80 and about 20 percent by weight of a mixture comprising between about 15 and about 85 percent by weight of a metal soap selected from the class consisting of the alkaline-earth and heavy metal soaps of oil-soluble petroleum sulfonic acids and carboxylic acids containing at least about 8 carbon atoms and between about 85 and about 15 percent by weight of the product obtained by reacting an alkylolamine monomer containing between 2 and about 20 carbon atoms with a fatty material selected from the class consisting of fatty acids containing at least about 12 carbon atoms and fatty oils which contain fatty acid radicals containing at least about 12 carbon atoms, said reaction being effected by heating a mixture of said reactants at a temperature between about 100° C. and about 320° for between about ½ and about 10 hours; and (3) between about 2 and about 10 percent by weight of an aliphatic amine containing at least about 10 carbon atoms.

20. A corrosion inhibiting composition comprising (1) between about 20 and about 80 percent by weight of a petroleum extract oil; (2) between about 80 and about 20 percent by weight of a mixture comprising between about 15 and about 85 percent by weight of lead naphthenate and between about 85 and about 15 percent by weight of the reaction product obtained by reacting diethanolamine with castor oil at a temperature between about 150° C. and about 280° C. for between about ½ and about 10 hours; (3) between about 2 and about 10 percent by weight of linseed oil, and (4) between about 2 and about 10 percent by weight of degras.

21. A corrosion inhibiting composition comprising (1) between about 20 and about 80 percent by weight of a liquid petroleum hydrocarbon; (2) between about 80 and about 20 percent by weight of a mixture comprising between about 15 and about 85 percent by weight of a metal soap selected from the class consisting of the alkaline-earth and heavy metal soaps of oil-soluble petroleum sulfonic acids and carboxylic acids containing at least about 8 carbon atoms and between about 85 and about 15 percent by weight of the product obtained by reacting an alkylolamine monomer containing between 2 and about 20 carbon atoms with a fatty material selected from the class consisting of fatty acids containing at least about 12 carbon atoms and fatty oils which contain fatty acid radicals containing at least about 12 carbon atoms, said reaction being effected by heating a mixture of said reactants at a temperature between about 100° C. and about 320° C. for between about ½ and about 10 hours; and (3) between about 2 and about 10 percent by weight of a drying oil.

22. A corrosion inhibiting composition comprising (1) between about 20 and about 80 percent by weight of a liquid petroleum hydrocarbon; (2) between about 80 and about 20 percent by weight of a mixture comprising between about 15 and about 85 percent by weight of a metal soap selected from the class consisting of the alkaline-earth and heavy metal soaps of oil-soluble petroleum sulfonic acids and carboxylic acids containing at least about 8 carbon atoms and between about 85 and about 15 percent by weight of the product obtained by reacting an alkylolamine monomer containing between 2 and about 20 carbon atoms with a fatty material selected from the class consisting of fatty acids containing at least about 12 carbon atoms and fatty oils which contain fatty acid radicals containing at least about 12 carbon atoms, said reaction being effected by heating a mixture of said reactants at a temperature between about 100° C. and about 320° C. for between about ½ and about 10 hours; and (3) between about 2 and about 10 percent by weight of a fatty material.

References Cited in the file of this patent

UNITED STATES PATENTS

| | | |
|---|---|---|
| 1,854,898 | Gill et al. | Apr. 19, 1932 |
| 2,583,399 | Wachter et al. | Jan. 22, 1952 |
| 2,614,980 | Lytle | Oct. 21, 1952 |
| 2,614,981 | Lytle | Oct. 21, 1952 |
| 2,675,355 | Lytle | Apr. 13, 1954 |